Aug. 16, 1960　　　R. C. A. ELAND　　　2,949,580
NEUTRALIZING CIRCUITS
Filed July 27, 1956　　　　　　　　　　8 Sheets-Sheet 1
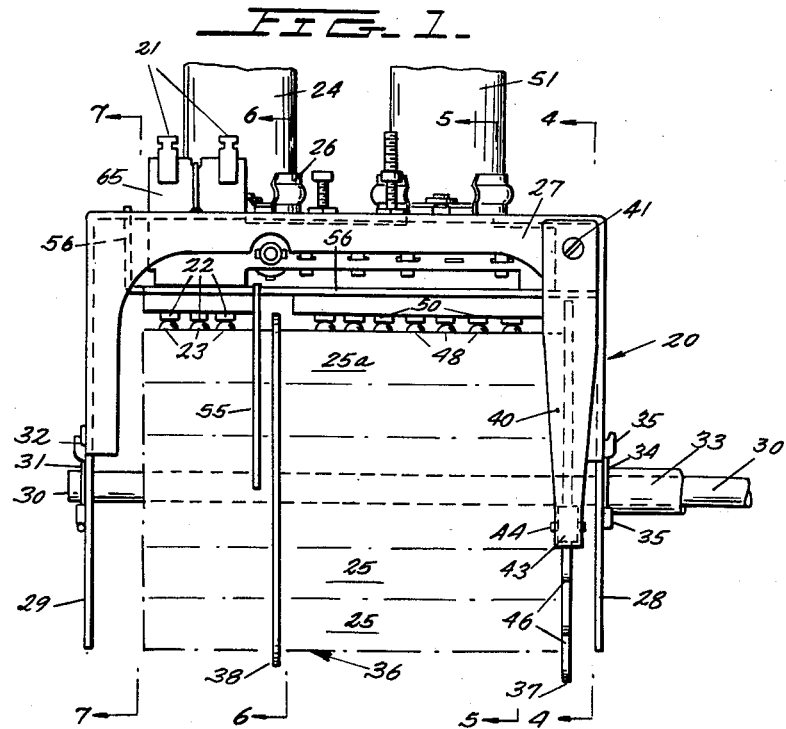
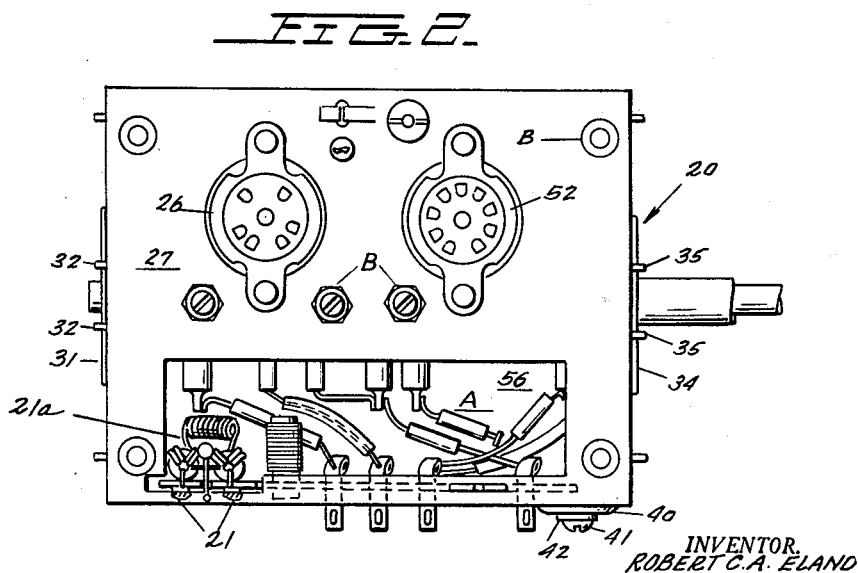
INVENTOR.
ROBERT C. A. ELAND
BY Ostrolenk, Faber,
Gerb & Soffen
ATTORNEYS

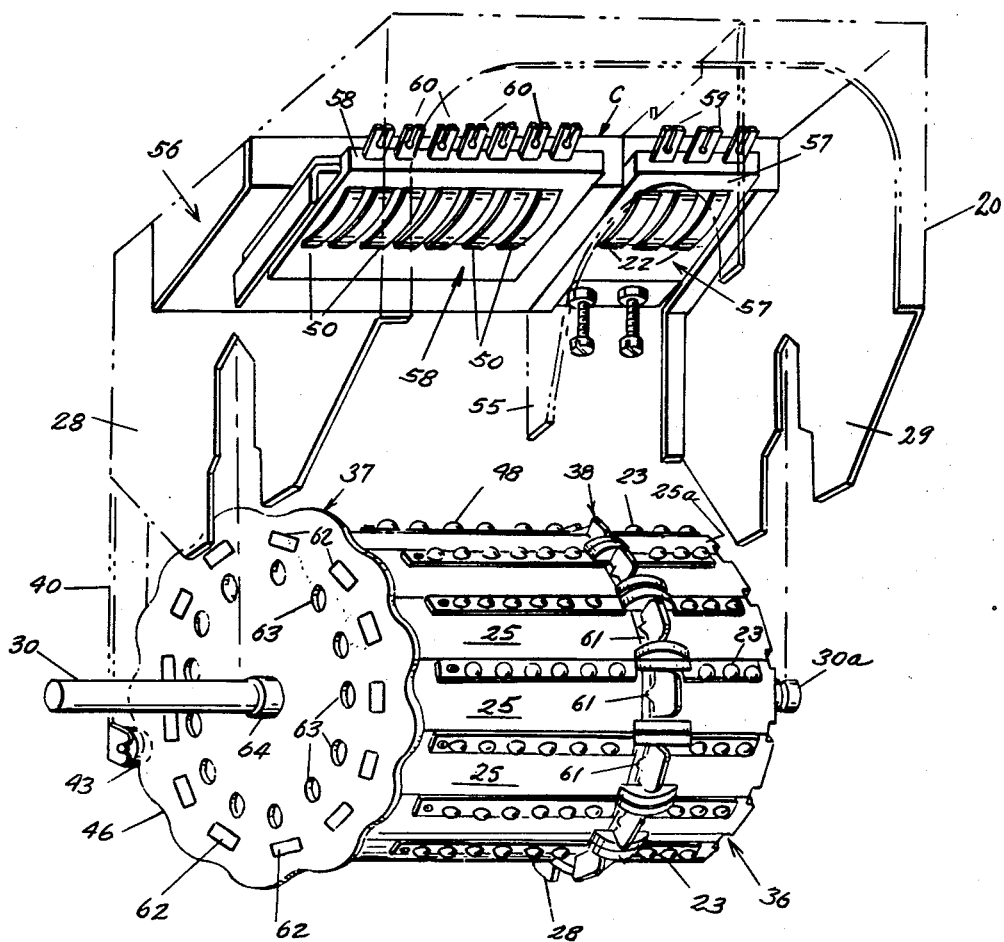

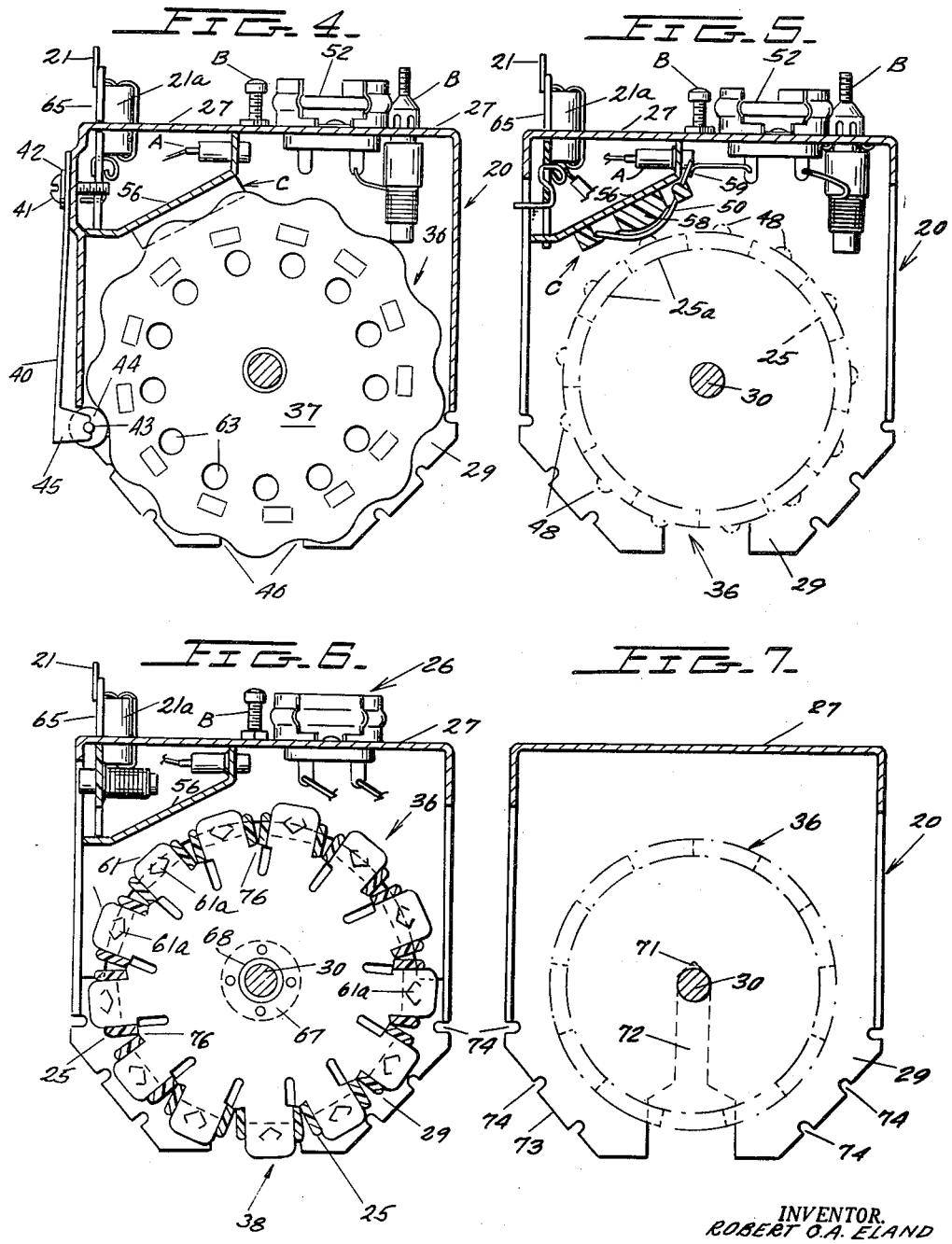

Aug. 16, 1960 R. C. A. ELAND 2,949,580
NEUTRALIZING CIRCUITS
Filed July 27, 1956 8 Sheets-Sheet 4
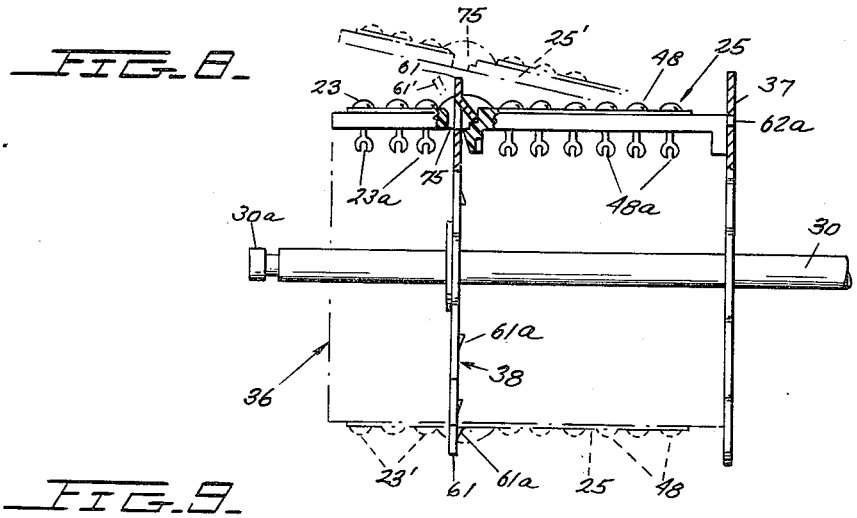
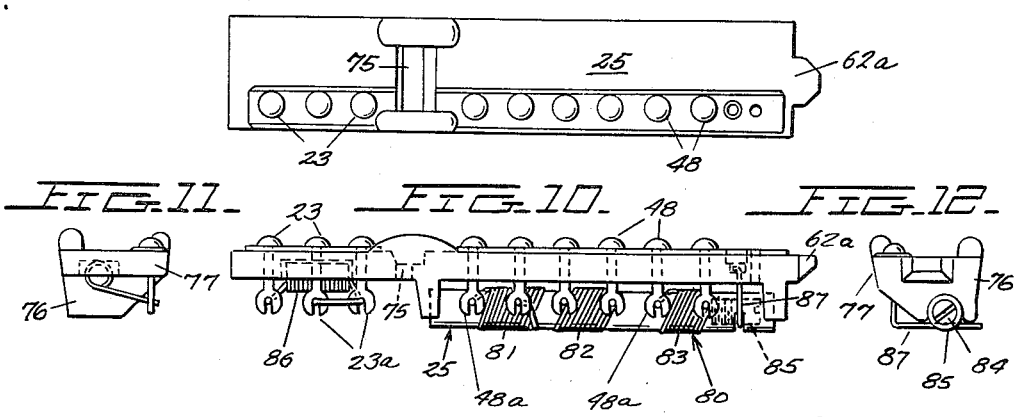
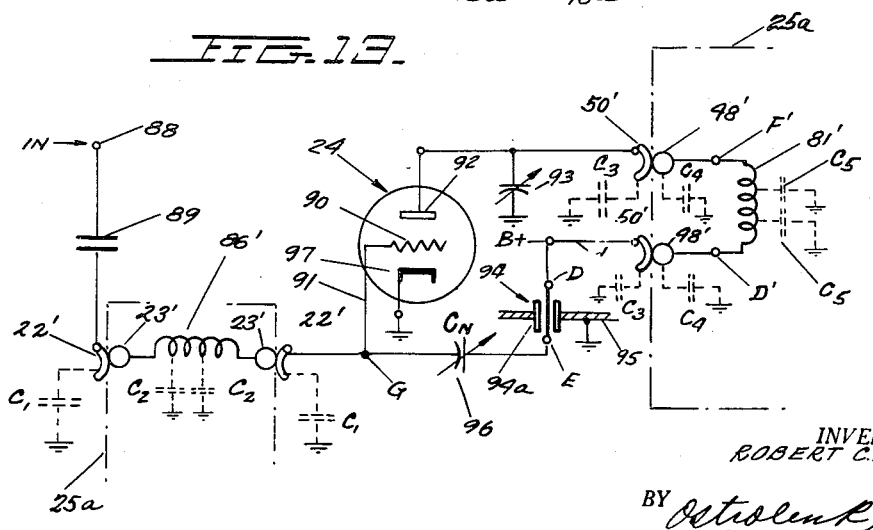
INVENTOR.
ROBERT C.A. ELAND
BY Ostrolenk, Faber,
Gerb & Soffen
ATTORNEYS Aug. 16, 1960
R. C. A. ELAND
2,949,580
NEUTRALIZING CIRCUITS
Filed July 27, 1956
8 Sheets-Sheet 5
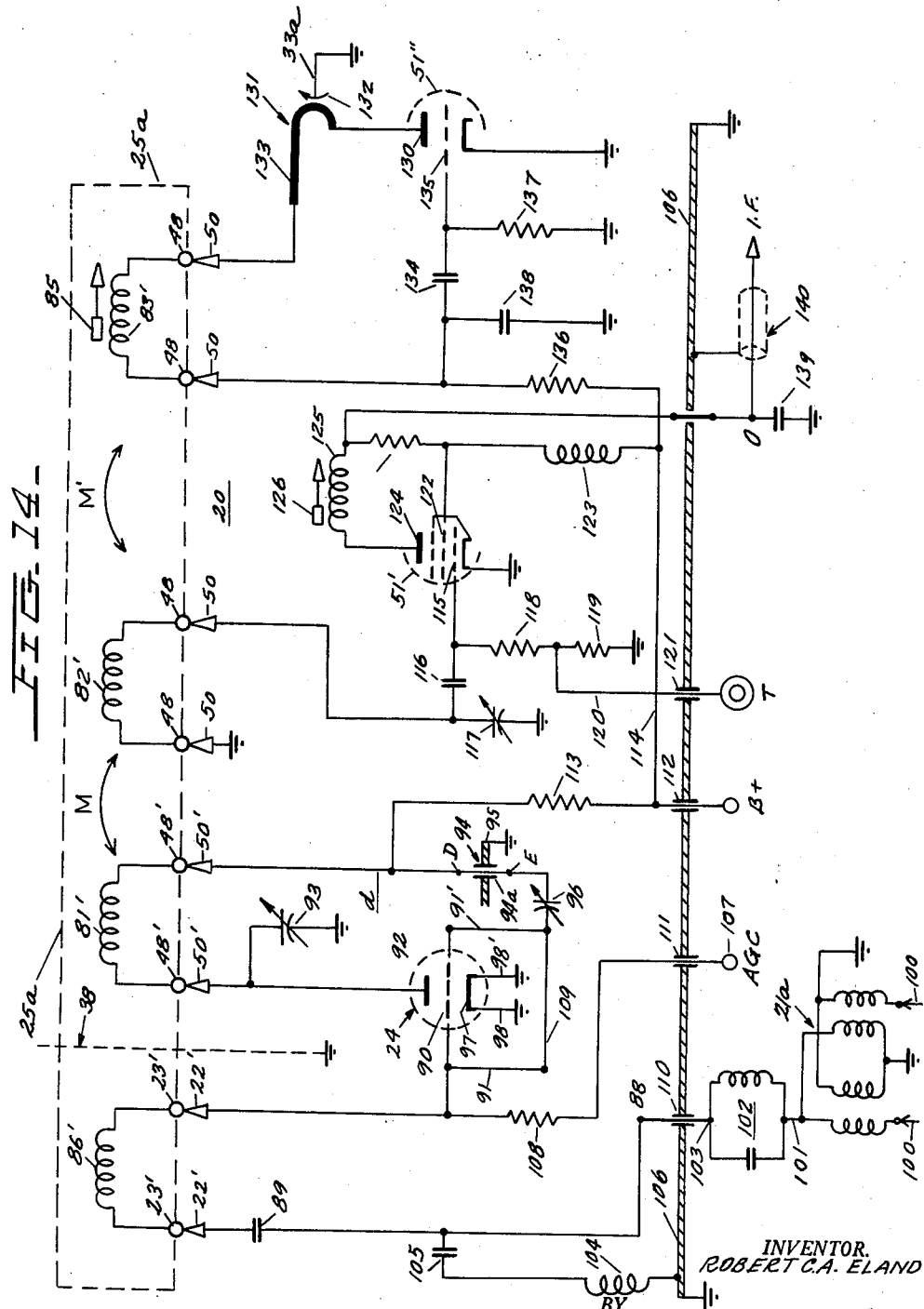
INVENTOR.
ROBERT C.A. ELAND
BY
Ostrolenk, Faber,
Gerb & Soffen
ATTORNEYS

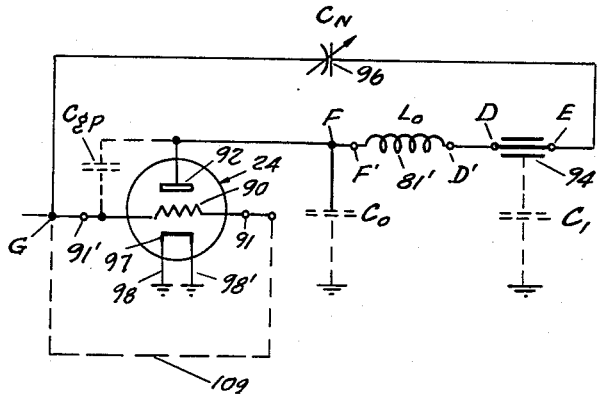

Aug. 16, 1960    R. C. A. ELAND    2,949,580
NEUTRALIZING CIRCUITS
Filed July 27, 1956    8 Sheets-Sheet 7

INVENTOR.
ROBERT C. A. ELAND
BY Ostrolenk, Faber,
Gerb & Soffen
ATTORNEYS

Aug. 16, 1960 R. C. A. ELAND 2,949,580
NEUTRALIZING CIRCUITS
Filed July 27, 1956 8 Sheets-Sheet 8
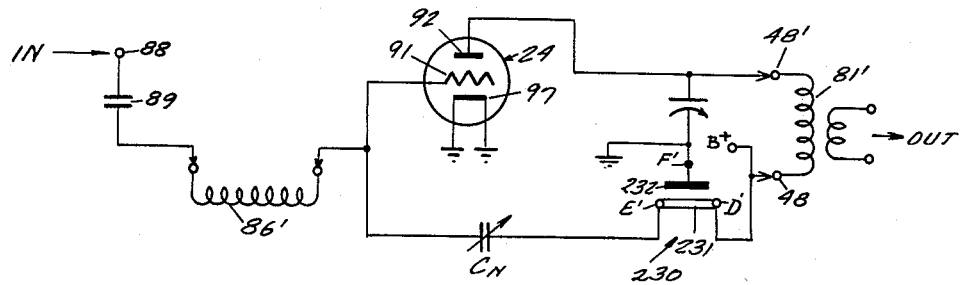
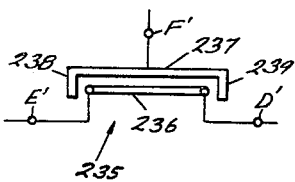 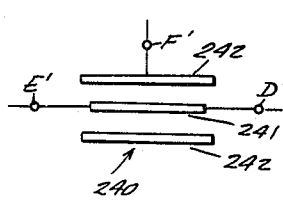 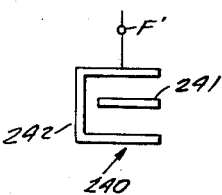
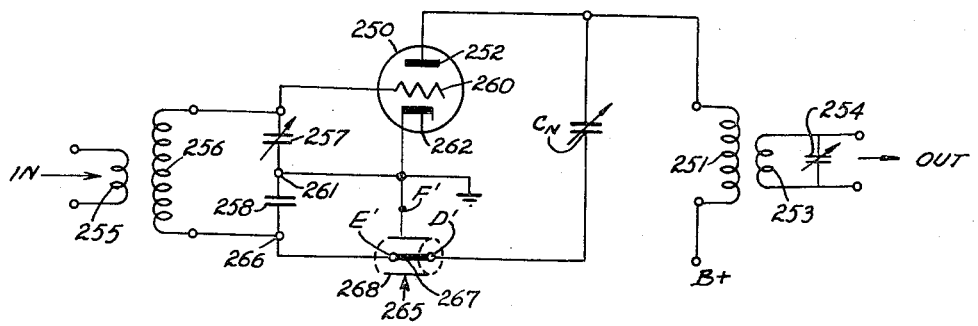
INVENTOR.
ROBERT C.A. ELAND
BY Ostrolenk, Faber, Gerb & Soffen
ATTORNEYS United States Patent Office 2,949,580
Patented Aug. 16, 1960

2,949,580

NEUTRALIZING CIRCUITS

Robert C. A. Eland, Arcadia, Calif., assignor to Standard Coil Products Co. Inc., Los Angeles, Calif., a corporation of Illinois Filed July 27, 1956, Ser. No. 600,496

19 Claims. (Cl. 330—79)

My invention relates to electronic circuits and more particularly to novel neutralizing circuit arrangements for wide band, high frequency amplifiers such as are required in television tuners. This invention is a continuation-in-part of my copending application Serial No. 499,418 filed April 5, 1955, which is presently abandoned in favor of this case.

As the art of television has expanded, the requirements for low cost, compact, light-weight television tuners has created the need for simplification of the amplifier portion of the circuit.

In the early days of television, a pentode tube was employed in the amplifier circuit as the only workable amplifier tube. The pentode had the defect of being relatively costly and because of the number of grid elements, was noisy, causing "snow" effects on remote signals. Despite these defects, the pentode continued as the only known practical amplifier in tuners of television circuits until 1950.

The invention by E. Keith Nelson (application Serial No. 211,959, filed February 20, 1951, now issued as Patent No. 2,775,659, and assigned to the assignee of the present application), of a novel cascode circuit utilizing two triodes coupled from the anode of the first or driving triode to the cathode of a grounded-grid driven triode through an inductance which resonated with the inherent cathode to ground capacitance in the television band, represented a marked advance in the art. The triodes used in this cascode circuit substantially eliminated the noise produced by the pentode.

From 1951 until the present invention, all of the better grade of the millions of television sets manufactured in the United States used this cascode circuit. During all these years it was desirable that this novel cascode circuit which required the use of two triodes be replaced by a single triode. This, however, during all these years has been regarded by those skilled in the art as being impossible, chiefly because there was no known circuit arrangement to neutralize the plate to grid feedback signal over the broad VHF television band.

The present television VHF band covers a spectrum from 54 megacycles to 216 megacycles. While it is relatively simple and well known how to neutralize over a narrow frequency band, this has heretofore been an insolvable problem for so wide a band of frequencies as in the television range.

In order to achieve nuetralization, over the VHF range, it is necessary that a signal be generated which is substantially 180° out of phase with the feedback signal to be neutralized, and of equal magnitude to that feedback signal at the grid input. The coupling element for high frequency neutralizing signals must be a substantially pure capacitance (or if inductance is to be used for generating the neutralizing circuit, a pure inductance). Unless this coupling capacitance contains substantially no inductance, the neutralizing signal will have a phase shift as well as change in magnitude, and neutralization will not be achieved over the VHF band.

I have discovered that if I utilize a capacitor of substantially no inherent inductance and particularly by a special connection to the capacitor of the anode and grid circuits to prevent any inductive coupling therebetween, presenting to each of the circuits a substantially pure capacitance, I can achieve neutralization over the wide VHF band. As a result, I have found that I can replace the two tubes of a cascode circuit which has been in wide use for almost six years in tuners, by a single triode providing substantially the same gain and achieving a reduction in the overall cost of a tuner of about ten percent with corresponding reduction in size and weight. The invention tuner to be described has already been presented to the trade and met with first skepticism as unachievable, and then after testing with immediate commercial success.

More specifically, I have found one such capacitor to be a feed-through capacitor. This is a capacitor which may take many forms, one of which is of cylindrical shape in which the outer metal shield extends through an opening in the chassis of the television tuner and is rigidly secured thereto forming a direct ground connection. An inner conductor forms the second electrode which is spaced from the outer shield by a dielectric. A terminal is secured at one end of the inner shield and may extend therethrough and beyond the other end.

This type of capacitor, called a feed-through capacitor, may be considered as having distributed capacitance along its length. However, looking at this capacitor from either end, it looks like a substantially pure capacitance. This is so because signal current entering the capacitor at one end mostly flows through the distributed capacity to ground, all as will be explained more fully hereinafter.

Accordingly, an object of my invention is to provide a novel neutralizing circuit.

A further object of my invention is to provide a neutralizing circuit in which the coupling unit is effectively a substantially pure electrical element such as capacitance.

Still a further object of my invention is to provide a novel coupling comprising a capacitor having relatively little inherent inductance.

Yet another object of my invention is to provide a feed-through capacitor as a coupling element for a neutralizing circuit.

The principles and means of the present invention are disclosed for television tuners that have discrete sections arranged on a turret or wafer design. As will be set forth hereinafter, television tuners with their predetermined and substantially uniform capacitance in their switching system, may advantageously be neutralized by my present invention with a fixed circuit for the full VHF frequency range of operation.

In accordance with the present invention, the neutralization condenser between the plate circuit and the control grid is effected at close physical relation and with a feed through or button capacitor therebetween having very low internal inductance. Thus, for the effective capacities and over the wide frequency range of the signal, the inductance factor otherwise present in connection leads is minimized so as to have negligible effect on the phase of the feed-back neutralization signal, as will be set forth in more detail. A novel circuit configuration is provided to balance and feed back signals. Complete and effective neutralization is thus afforded with high frequency amplification over a wide frequency band and with performance and noise characteristics equivalent to those of a cascode amplifier.

A cascode amplifier, as is well known in the art, is utilized in television tuners to provide a wide band of amplification at reasonably uniform level, and with minimum noise and good gain. It is well established that the use of triode amplifier stages provides minimum noise, while multigrid tubes such as tetrodes and pentodes have inherent noise in their utilization. However, conventional utilization of triodes at the wide frequency range of the VHF bands would require a plurality of individual neutralization circuits for the channels. Such complexity in television tuners would require a further switching section.

As stated above, cascode tuners provide good amplification with minimum noise by utilizing two triode stages in cascade relationship wherein the second stage is connected as a signal-grounded grid amplifier coupled to the output of the first stage which is cathode grounded. A small coil is connected in series between the anode of the first triode and the cathode input of the second triode, tuned to a frequency in the upper VHF band, such as at channel 13. The net result is the system known as cascode amplification.

The gain of the first cascode stage is at or near unity due to the loading of the second stage which is grid-grounded. Accordingly, neutralization is not necessary in a cascode amplifier, any feedback signals of high frequency signals into the first triode stage has negligible effect on its performance because of low amplification thereat. However, it has been recognized that the cascode circuit, utilizing a dual triode or two triode tubes, is more expensive to use than a single stage, whether a triode or a pentode RF amplification stage.

The present invention utilizes a single triode amplifier stage as the RF amplifier for a television tuner in the VHF frequency range, namely from 54 to 216 megacycles, without the requirement for individual neutralization for all the channels 2 to 12. In other words, a single or fixed neutralization circuit is embodied in the triode amplifier stage of the present invention which effectively neutralizes the system over the said wide amplification range.

The neutralization circuit of the present invention embodies a feed-through or low capacity condenser related to the triode interelectrode capacitance, as will be set forth, connecting the low or signal-ground end of the output coil to ground, and further, constituting a pie-circuit at the output of the triode including the triode plate-to-ground capacitance and the output coil inductance. The neutralization condenser is thereupon connected between the feed-through or low inductance value condenser and the grid electrode of the triode, all as will be set forth hereinafter. The grid-to-plate capacitance of the triode amplifier is also incorporated in the invention neutralization system, as part of a balanced network established over the wide frequency range of the amplifier hereof.

A primary feature of the present invention is the incorporation of the aforesaid neutralization circuit in television tuners having a substantially constant capacitance configuration for its switchover assembly to ground, for all the respective channel tuning positions. Towards this end a turret tuner having twelve sets of inductance panels arranged about a drum in the manner of United States Patent No. 2,496,183 is utilized with the fixed neutralization configuration of the invention triode circuit, neutralized for the full VHF band of operation of the tuner.

As each channel is selected by motivation of the turret drum to fixed switch contacts of the tuner, the inductance and capacity effects of the unused panels do not affect the capacitance configuration of the selected set of panels with the switch contacts, nor their capacitance configuration to ground, as will be hereinafter set forth.

Also contemplated as a tuner construction of substantially fixed switch-to-ground capacitance over the tuning range is the disc or wafer type of tuner as described in United States Patent No. 2,543,650 and in application Serial No. 564,796 filed February 10, 1956, both assigned to the same assignee as the present case, wherein the contacts are fixed and the disc or wafers are motivated.

More specifically, I have found that the combination of a multi-channel television tuner in the VHF band that otherwise would require selective neutralization for its triode, can be fixedly neutralized with a single neutralization circuit as set forth hereinabove for the 54 to 216 megacycle range, where the capacitance configuration of the tuner, and particularly of the switching assembly thereof is maintained reasonably constant throughout the twelve channel positions, as will be set forth hereinafter.

The switch wafer type of tuner, wherein the wafer is fixed and contact arm associated therewith is rotated for selective tuning, has the capacitance of the switch assembly change for each of the tuning positions. Such type of tuner with changing switch capacitance configuration from channel to channel precludes fixed triode neutralization over the wide VHF band of frequencies.

It is accordingly a further object of the present invention to provide a novel radio frequency amplifier stage incorporating a triode neutralized in a novel manner to perform the equivalent of a cascode amplifier in television tuners.

Another object of the present invention is to provide novel fixed neutralization for practical triode amplification over the VHF band in a television tuner.

A further object of the present invention is to provide a novel television tuner with a triode amplifier incorporating a capacity of negligible inductance at the plate circuit connection to the neutralization means for the triode control grid.

Still a further object of the present invention is to provide a novel television tuner with a neutralized triode amplifier for the VHF band of frequencies, having overall performance characteristics equivalent to a cascode amplifier for the same purpose.

Still another object of the present invention is to provide a novel television tuner having a triode amplifier RF stage with fixed neutralization for the VHF band of operation in combination with a tuner structure incorporating a switching contact system for multi-channel selection with a substantially constant capacitance configuration for all channels.

A further object of the present invention is to provide a novel turret tuner for multi-channel television reception in the VHF band, having a triode amplifier stage neutralized by a fixed circuit configuration for the VHF band of operation.

These and further objects of the present invention will become more apparent in the following description of an exemplary embodiment thereof, taken in connection with the drawings in which:

Figure 1 is an elevational view of the exemplary tuner.
Figure 2 is a plan view of the tuner of Figure 1.
Figure 3 is a perspective view of a section of the tuner of Figure 1, showing the switch contactor arrangement and the turret separated from the tuner.
Figures 4, 5, 6 and 7 are vertical cross-sectional views through the tuner taken along the corresponding lines 4—4, 5—5, 6—6 and 7—7 in Figure 1.
Figure 8 is a cross-sectional view through the turret section of the tuner of Figure 1, illustrating the removal of an individual tuning panel thereof, in dotted lines.
Figure 9 is a plan view of a tuning panel for the turret tuner.
Figures 10, 11 and 12 are respective elevational and end views of the panel of Figure 9.
Figure 13 is a diagram of a triode amplifier stage neutralized in accordance with the present invention.
Figure 14 is a schematic diagram of a VHF television turret tuner embodiment incorporating the neutralized triode RF amplifier stage in accordance with the invention.
Figures 15 and 16 are schematic diagrams used in the exposition of the neutralization principles of the present invention.
Figures 17 and 18 are exemplary embodiments of the negligible inductance low capacity units used in the invention circuit.

Figure 19 is a schematic representation of the invention neutralizing system.

Figure 23 is a schematic diagram of a modified circuit for the neutralization stabilization.

Figures 24, 25 and 26 are further illustrations of condenser isolators.

Figure 27 is a circuit diagram of a further neutralization system in accordance with the present invention.

Figure 20:
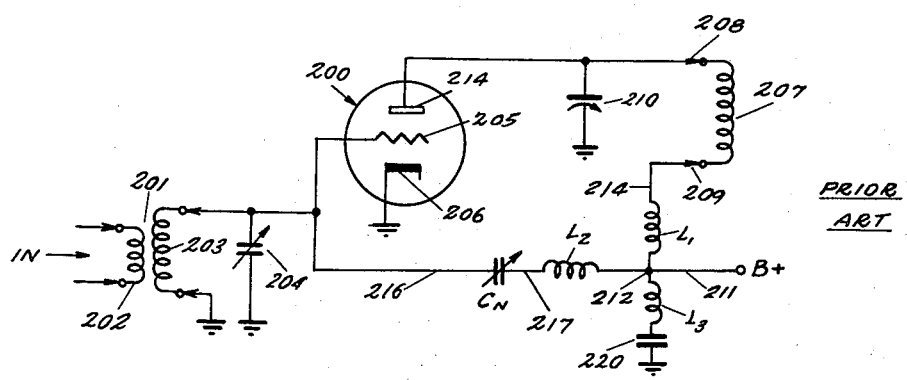
Figure 20 is a schematic diagram of a typical prior art neutralization circuit.

An exemplary embodiment of a television tuner construction incorporating the neutralization circuitry of the present invention is illustrated in Figures 1 and 2. The tuner 20 is of the drum or turret type. Tuner 20 is a VHF tuner, tunable to the existing twelve VHF channels, namely channels, 2 to 13, covering the frequency spectrum of 54 to 216 megacycles. The antenna input terminals 21, 21 of tuner 20 are connected to an antenna transformer 21a (Figure 2). The output terminals of antenna transformer 21a are connected to the switch contacts 22, 22 which in turn co-act with the antenna coil contact buttons 23, 23 of panel 25a that is in engagement with the tuner circuitry for a particular selected channel tuned in. Further details of contactors 22, 22, contacts 23, 23, panel 25a, and their intercircuital relationships are described hereinafter.

The contact buttons 23, 23 are connected to the input coil for the grid input circuit of RF amplifier stage 24 of tuner 20. The triode vacuum tube 24 is mounted in a suitable tube socket 26 supported on the chassis frame 27 of tuner 20. A tube shield (not shown) is placed about tube 24 for minimization of signal radiation and interference. The mechanical aspects of tuner 20 are similar to the construction shown in co-pending application Serial No. 501,919 filed on April 18, 1955, and assigned to the same assignee as the present case.

The frame of tuner 20 is of box-like form and made of metallic chassis sheet. The tuner has ends 28, 29 upon which the drum or turret control shaft 30 is mounted. An encompassing shield about the open bottom and sides of tuner 20 is not illustrated, but is in present day practice utilized to fully enclose the circuits within the shielded frame to minimize radiation and interference for the tuner.

The left end 30a of shaft 30 is supported within a suitable opening in tuner end plate 29 and maintained in fixed and rotatable relationship by wire spring 31 engaging lugs 32 projecting from panel 29. Sleeve shaft 33 is concentric about the forward end of control shaft 30, and in the exemplary embodiment projects interior of tuner 20 through front plate 28 for operating a fine tuning condenser (not shown, see Figure 14), wherein the oscillator of the tuner is adjusted for more accurate definition and reception of individual channels. A wire spring 34 suitably engages sleeve shaft 33 and is anchored in lugs 35, 35 projecting from face plate 28 to maintain the shaft assembly 30, 33 in rotatable stability.

The turret or rotatable drum 36 of tuner 20 is secured to control or selector shaft 30, and is constituted of two discs 37, 38 secured to shaft 30. The channel panels 25, 25 are mounted peripherally of discs 37, 38 to form a drum structure known as the turret (36) or the turret tuner (20). A detent arrangement is provided to maintain each panel in its selected position and co-action with the contactors of the tuner circuit. The detent system comprises spring arm 40 secured by a screw 41 to a corner of chassis 27, with a lock washer 42. A roller 43 is rotatable on a pin 44 mounted in depending arms 45 (Figure 4) of arm 40. Detent roller 43 co-acts with depressions 46, 46 in the peripheral surface of disc 37 to constitute the detent or holding means for drum 36 after motivation by control shaft 30.

The circuit elements including inductance units in the panels 25 are selectively engaged with the fixed contactors 50, 50 in the tuner 20 body, through the associated contact points or buttons 48, 48 of engaged panel 25a. The panel contacts 48, 48 and associated contactors 50, 50 circuitally engage the coils of panel 25a with the fixed circuitry of the tuner 20 constituting the RF or triode 24 amplifier output coil, and the oscillator and mixer coils (see Figure 14). Portions of the fixed circuitry of tuner 20 are shown at A in Figure 2, including resistors, condensers, coils, etc.

Circuit adjustment and trimming during manufacture of the tuner, or during servicing, are performed through suitable trimmer condensers and inductances with a number of them adjustable from the exterior of tuner 20 and indicated at B. Since the general circuit arrangement and structure of the tuner form no essential part of the present invention, it is not more detailed at this point. However, the switch assembly contactor system 22, 50 of the tuner, and its relationship to the panels 25, are important to the present invention, as are the triode neutralization circuit details to be described hereinafter. A dual tube 51 is used as a combination triode oscillator and pentode mixer for tuner 20. Tube 51 is suitably mounted in tube socket 52 secured to the chassis base 27, and connected into the tuner circuit in the usual manner.

An arcuate shield plate 55 extends between the antenna input circuit section of the tuner and the circuitry involved with the RF tube 24 output and the mixer-oscillator circuits including connections 48, 50 of panels 25. Shield 55 is secured to the tuner sub-base 56 and subtends the circular drum to which it is adjacent (see Figure 3). Sub-base 56 is secured to the chassis structure 27. The sub-base 56 serves to shield the fixed circuitry A from the engaged panel 25a circuitry, and also supports the contactor structure 22, 50 as will be more fully described.

Figure 3 is a perspective illustration of a portion of the interior of the tuner 20 illustrating the exemplary construction and arrangement for contactors 22 and 50, which coact with the contact buttons 23 and 48 on respective channel panels 25 on turret 36. The RF or antenna input section includes contactor strips 22, 22 mounted in insulation base 57 supported in metallic sub-base 56. The contactor strips 22, 22 are arcuate and insulated from each other, and from the remainder of the tuner, through molded base 57. In a similar manner, molded or composition base 58 supports arcuate contactor strips 50, 50 in suitable spaced relationship and in position for tuner 20. The assembly of insulation base 58 and contactor strips 50, 50 is in turn firmly supported in metallic sub-base 56 of the tuner 20.

Electrical connection to the respective contactor strips is made through terminals 59, 59 extending from antenna strips 22; and 60, 60, extending from contactor strips 50, 50. The smooth and arcuate contact strips 22 and 50 are of springy material for firm engagement with the co-acting contact buttons 23 and 48 of each selected panel 25a. The electrical connection between the fixed circuit portion of the tuner 20 and the coils and components within each of the panels 25 is accordingly performed by the positioning of the turret 36 in the tuner of Figure 1, wherein the contact buttons 23 and 48 are pressed against the springy contactor strips 22 and 50, in a selective manner and as described in the aforesaid application Serial No. 501,919.

The exemplary turret 36 comprises panels 25, 25 which are in the form of a single or unitary longitudinal strip for each channel. It is to be understood that other equivalent constructions, such as sectional panels of two or more members, may instead be employed for each channel of the turret 36. The unitary panels 25 are of insulation molded material, having a longitudinal configuration upon which the respective contact buttons 23 and 48 are mounted, and project for co-action with the respective contactor strips 22 and 50. The detent roller 43 firmly holds drum 36 in each selected contacting position of contact buttons 23, 48 with contactors 22, 50.

The exemplary drum 36 has twelve panels 25, each of which are supported about the drum through tongues 61 projecting from disc 38 for individual engagement with corresponding apertures in panels 25. Rectangular slots 62, 62 are placed in forward disc 37 to engage protuberances from the respective panels 25 to lock each panel in rigid position about drum 36, as detailed in the application Serial No. 501,919. Circular apertures 63, 63 are arranged about disc 37 for final adjustment or servicing of inductor slugs within the panels 25, as described in connection with Figures 10 and 12 hereinafter. The tongues 61, 61 are flexible and permit ready engagement or disengagement of panels 25 from the drum structure 36.

The turret or drum type of tuner of the exemplary embodiment accordingly engages the selected panel 25a into circuital connection to complete and establish the necessary and operative tuner circuitry. At this junction it is important to note that the contactor strips 22, 22 and 50, 50 are constituted of finite linear metallic strips to accomplish the spring biased contacting function with the contactor buttons 23, 23 and 48, 48. The contactor strips 22 and 50 have finite size and area, and are geometrically related to their respective dielectric mounting blocks 57 and 58 as well as the metallic sub-chassis 56, and to the metallic frame of the tuner 20 including top chassis plate 27.

Essentially therefore there exists a capacitance between the respective contactor strips 22 and 50 with the grounded metallic frame structure including 27 and 56. Such capacitance is relatively low, which in a good design can be made as low as the order of only several micro-microfarads. Nevertheless, such capacitance inherently exists in the exemplary type of turret tuner. It is further important to note that regardless of the channel tuned-in, or the frequency band corresponding to the selected panel 25a in juxtaposition with the contactor strip assembly C (including contactors 22 and 50 together with the mounting blocks 57, 58, subchassis 56, etc.), that the resultant capacitance of the contact strips 22 and 50 to ground, and associated capacitance of the panel 25a with contact buttons 23, 48, its contained inductance elements, etc., have a fixed capacitance to the grounded chassis or signal ground of the tuner.

Thus, as control shaft 30 rotates drum 36 to any of the twelve VHF channel positions, the inherent capacitance due to the geometric configuration and construction of the fixed contact assembly C and the particular panel 25a coacting therewith, results in a substantially constant capacitive relationship to ground of panel 25a, contactor assembly C, and respective portions thereof to ground. The significance of such constancy of inherent capacitance of the switching and contactor assembly with panel 25a to ground will be further elaborated upon in connection with the fixed neutralization circuitry and system incorporated in the exemplary tuner 20 in connection with Figure 13 et seq.

Figure 4 shows end disc 37 secured to shaft 30 by annular flange 64. Sub-base 56 is supported in triangular fashion across the upper left corner of the chassis frame structure of tuner 20. Antenna input transformer 21a extends from a board 65 projecting into the triangular corner including sub-base 56. Contact assembly C is dependently mounted from the sub-structure of base 56. Circuit portion A is within the triangular enclosure formed by sub-base 56 and chassis 27. The detent action of roller 43 upon indentations 46 along the periphery of disc 37 is clearly illustrated in Figure 4.

Cross-sectional view, Figure 5, taken vertically through Figure 1, is intermediate of the disc of the turret 36. The panel members 25a and 25, 25 are shown in dotted lines, with their corresponding projecting contact buttons 48, 48. The co-action of contact buttons 48, 48 (and 23, 23) co-act with the contactor assembly C against spring biased contactor strips 50, 50 (and 22, 22). The insulation mounting block 58 for the contactor strips 50 is shown in cross-section having an arcuate central portion which projects the contactor strips 50, 50 into firm contacting engagement with the co-acting buttons 48, 48 of the panel 25a in selection position.

The respective contact strips 50, 50 through their terminals 59, 59 complete the tuner circuitry between the panel 25 elements and the fixed tuner components, in a predetermined manner as do the contact strips 22, 22 with panel buttons 23, 23 at the antenna input. The geometric disposition of contact strips 50, 50 with respect to metallic sub-chassis 56 and tuner body 20, including chassis plate 27, is seen in Figure 5 as constituting a predetermined capacitance between the respective contactor strips 50 and the chassis ground or circuit reference potential of tuner 20. Likewise, the capacity of the panel 25a, circuitally engaged with the contactor strips 50 (and 22), completes the capacitive configuration of the engaged panel 25a components to ground and with the associated contactor strips 50. Also, it is to be noted that the panels 25 which are not engaged with the contactor assembly C, have no circuit effect and do not change the geometric capacitive distribution of the engaged panel 25a with contactor strips 22 and 50 for different selected positions of panels at the 25a engaged position.

Cross-sectional view Figure 6 is taken vertically through the tuner adjacent the interior panel support disc 38 of the drum or turret 36. A flanged member 67 is riveted to one face of disc 38, and contains a short sleeve portion 68 secured to the control shaft 30. Tongues 61 extend radially from the disc 38 and contain notches 61a for locking the respective panels 25 in position about the periphery of turret 36, as shown clearly in Figure 3. The respective panels 25 have apertures at the position of tongues 61 for engagement by lugs 61a thereof. The tongues 61 of disc 38 are springy in order to be displaced within the rectangular slots of the panels 25 for engagement and disengagement.

It is to be further noted that the metallic disc 38, being secured to the control shaft 30 which in turn is grounded at the respective frame ends to the chassis of tuner 20, serves as a grounded shield between the antenna input section of the panels 25 and the remainder of the tuner circuit. The cross-sectional Figure 7 towards the far end of the tuner 20 illustrates the engagement of control shaft 30 in the triangular end 71 of the vertical slot 72 in end plate 29 of the tuner 20 chassis. The relative position of the turret 30 is indicated in dotted lines with respect to the tuner 20 of Figure 7. The bottom edges 73, 74 of end plate 29 are truncated and have small undercuts along their edge for firm gripping of the external shield for the tuner previously referred to.

Figure 8 illustrates the engagement and disengagement of respective panels 25 in the turret 36. Each panel 25 has a projection 62a which is inserted in the corresponding slot 62 of annular disc 37. Each tongue 61 radiating from disc 38 co-acts with a panel 25 through its transverse rectangular slot 75. Arresting lug 61a of tongue 61 grips panel 25 to maintain it firmly on shoulders 76 of each tongue 61 (see Figure 6). Each panel 25 is accordingly firmly engaged about the turret 36 in the single strip panel embodiment hereof. When removal of an inserted panel 25 is desired, the tongue 61 is moved to the position 61', releasing arresting lug 61a from panel 25 whereupon the panel 25 is lifted out of drum 36 as indicated at 25'. Connection lugs 48a extend from each of the connecting buttons 48 of panel 25; as do lugs 23a from buttons 23. The coils or other circuit components of the panels 25 are not indicated in Figure 8, for clarity.

Figures 9 to 12 illustrate one form of panel 25 in exemplary turret 36. The top view, Figure 9, illustrates projecting lug 62a, and rectangular slot 75 for engaging panel 25 with respective discs 37 and 38. The end views, Figures 11 and 12, illustrate the inclined or tapered relationship of longitudinal faces 76, 77 of panel 25, in order that they may nest contiguously about turret 36, as shown in Figures 3 and 6. A coil form 80 is arranged within the interior panel 25 and contains respective coils 81, 82 and 83, the ends of which are in circuit connection with lugs 48a of connection buttons 48.

In the exemplary embodiment, coil 81 is the plate output coil of RF triode amplifier stage 24; coil 82 the mixer input coil, mutually coupled to coil 81; and coil 83 the oscillator coil. A brass or powdered metal slug 85 is in engagement with the right end of coil form 80 for co-action with oscillator coil 83. The slug 85 has a transverse slot 84 whereby screwdriver adjustment of the inductance of each of the coils 83 about the tuner is effected in initial test or servicing, and accessible through the holes 63, 63 of the disc 37 (see Figure 3). Antenna input coil 86 is connected to the respective lugs 23a of connection buttons 23. Spring 87 is used to hold slug 85 in its adjusted position.

Figure 13 is a schematic illustration of an exemplary neutralized wide-band VHF triode stage 24, incorporating the input and output coils of turret 36 corresponding to a connected panel 25a for receiving a predetermined one of the television channels. In view of the high frequency signals involved, it is preferred that the triode stage 24 be a vacuum tube conventionally designed for amplifying high frequencies of the order of 50 to 250 megacycles. The input circuit to the grid electrode 90 of tube 24 is a series tuned circuit from input terminal 88, to which the antenna transformer output is connected. The grid input comprises series condenser 89 fixed in the tuner circuitry, and the series coil 86' of the antenna section of inserted panel 25a between contact buttons 23', 23'. The panel buttons 23', 23' co-act with the corresponding fixed contactor strips 22', 22' of the tuner, as described hereinabove and illustrated for example in Figure 3, and are in series connection to the grid terminal lead 91.

The series tuned input circuit 86'—89 for triode stage 24 is a significant factor in the utilization of the stage 24 as a high frequency stabilized amplifier in conjunction with the neutralization to be set forth in more detail. It is to be noted that contactor strips 22', 22' have capacitance $C_1$, $C_1$ to ground, which is geometrically fixed in a given turret tuner construction. Also, series inductor 86' has capacitance $C_2$, $C_2$ to ground indicated in dotted lines, as well as self-capacitance. It is to be noted that the integrated value of the capacitance $C_1$, $C_2$, self-capacitance of coil 86', together with other inherent capacitances in the input circuit to grid electrode 90, as well as the grid 90 to cathode 97 (to ground) capacitance of tube 24, and condenser 89, all constitute the capacitance of the "series tuned" input between the terminal 88 and grid electrode 90.

Since the fixed inherent capacitances of the circuit including $C_1$, $C_2$, 89, and the grid electrode 90 to ground capacity remain constant for a given tuner, the insertion of predetermined coils (86') to provide series resonance for a selector channel results in proper efficient tuned input to RF stage 24. It is also to be noted that the inductance value of coil 86' is significant at the frequency to which it is series resonant in the tuner input. Thus, oscillation signals from the remainder of the tuner, as from the oscillator and mixer stage, which otherwise are conducted through tube 24 due to the plate to grid capacitance, are by the use of the series circuit 86'—89 herein effectively choked off due to the low-band filter effect of coil 86'. The use of a parallel tuned circuit at the triode input for the high frequency neutralized tuner of Figure 13, or to be described in connection with Figure 14, permits radiation of the oscillations in the tuner, and does not cut off such oscillations by a filter effect, and would make expensive traps necessary.

Further, the relatively high impedance value of coil 86' when used as a series tuned coil, as described above, makes the lead inductance corresponding to lead 91 to the actual grid electrode position 90 appear relatively small in the circuit. Therefore utilization of two separate grid leads to the terminae of grid 90 is not necessary. As disclosed in my prior co-pending application Ser. No. 499,418 two grid leads were used to minimize off-phasing of the neutralization due to the shunt tuned coil input, rather than the use of the series coil tuned input herein.

The tuned or resonant output circuit of RF triode amplifier 24 extends from plate electrode 92, and comprises adjustable condenser 93 connected to ground, and output coil 81' to the B+ supply. The B+ terminal of output coil 81' is connected to the grid terminal 91 through the neutralizing circuit comprising negligible inductance feed-through condenser 94, the shell of which is grounded to the tuner chassis 95, and adjustable neutralizing condenser 96. Further details as to the function, relationships and parameters of the respective neutralization components 94, 96 and the circuital aspects of the wide-band high frequency neutralization effected on RF triode stage 24 and the tuner thereof, will be set forth in more detail hereinafter.

At this juncture, it is pointed out that the capacitances effected due to the geometric relationship of the contacts 48, 50, and coil 81' to the chassis and ground of the tuner (20) are predetermined and substantially fixed, regardless of the particular channel output coil 81' in circuit with anode 92. The effective capacitance to ground of the contactor strips 50', 50' is represented by the dotted capacitance $C_3$, $C_3$; and similarly, the capacitance to ground of contact buttons 48', by condensers $C_4$, $C_4$. The capacitance of coil 81' to ground is represented by condensers $C_5$, $C_5$. The inductance of coil 81' is selected or adjusted to resonance for the channel frequency to which its panel 25a is predetermined, and incorporates the various capacitances $C_4$, $C_3$, $C_5$, in conjunction with fixed adjusted condenser 93, in signal parallel resonance therewith, and including its own self capacitance.

The frequency to which coil 81' and condenser 93 are adjusted in conjunction with the inherent capacitance in their circuit is predetermined for each channel. It is important that the extraneous capacitances corresponding to $C_3$, $C_4$, $C_5$ for different channel positions of the turret tuner be predetermined and substantially uniform in order that the compensated neutralization circuit, including condensers 94 and 96 be effective for all the twelve channels, and over the wide band of 54 to 260 megacycles, to which the RF amplifier 24 is used for the VHF television tuning. Thus, since coil 81' is replaced by corresponding other coils, as the panels 25 replace each other selectively in the 25a position, the capacitances corresponding to $C_4$ and $C_3$ remain constant in tube 24 output circuit, as does the adjusted condenser 93, and the only change is the minor capacitance differences corresponding to $C_5$, $C_5$ of the respective coils.

It has been found that the overall effective capacitance corresponding to the electrical summation of the capacities $C_3$, $C_4$ and $C_5$ for the twelve channel positions are substantially uniform and accordingly the invention neutralization network incorporating the low-inductance condenser 94 and adjustable neutralizing condenser 96, in a manner to be described, have been found effective for all twelve channels to produce sustained amplification and output of triode 24 as RF amplifier for tuner 20.

In contrast, where a conventional wafer type of circuit changing means is used for the tuner to change the inductance values in the plate output for the respective twelve channels, the capacitances to ground of the switching arm and coils, corresponding to $C_3$, $C_4$ and $C_5$ of Figure 13 become significantly different for each of the twelve channels. Accordingly neutralization of a triode stage for such wafer type tuners would be impractical with fixed neutralization, as is provided by the present invention.

Figure 14 is a diagrammatic representation of an exemplary circuit for tuner 20, embodying the triode RF amplifier stage 24 stabilized by fixed wide-band neutralization in accordance with the present invention. The tuner 20 is designed for operation in the VHF range, namely from 54 to 216 megacycles, signals of which are impressed from an antenna by balanced leads to the input 100, 100 of a balun type transformer 21a. Output terminal 101 of antenna transformer 21a is connected to a trap 102, the output 103 of which is impressed upon tuner input 88.

The RF stage input from terminal 88 is thereupon connected to the series resonant circuit 86', 89 to grid electrode 90 of triode 24, as described in connection with Figure 13. The selected panel 25a incorporates only two contact points 23', 23' for the signal series coil 86'. A series trap 104, 105 is utilized between the antenna input and ground. The chassis ground indicated at 106 separates the interior of tuner 20 (above base 106) from the exterior terminals and components, shown below 106.

Connections into the tuner 20 through the chassis 106 may be made through insulated apertures or feed-through capacitors, as indicated. Automatic gain control AGC signals are applied to terminal 107, and impressed upon the input to grid electrode 90 through series coupling resistor 108.

The triode stage 24 in a practical embodiment is an efficient high frequency type of triode such as the 6BN4 type, which has two separate terminal leads 91, 91' extending from the opposite ends of control grid 90; and likewise two terminal leads 98, 98' from cathode electrode 97. The invention, however, is equally applicable to types of triodes wherein only single terminal leads from the control cathode and electrodes are used. The cathode leads 98, 98' are grounded; and the leads 91, 91' of the control electrode 90 are interconnected by lead 109 in the present circuit. The feed-through condenser 110 to input terminal 88, in the exemplary embodiment, is 30 mmf.; whereas condensers 111 and 112 are 1000 mmf. The B+ supply fed through chassis 106 through fed-through condenser 112 is applied to coil 81' through dropping resistor 113; and is conducted by lead 114 to the anode supplies for the mixer and oscillator stages. The dropping resistor 113 keeps the RF potential at points D and E above signal ground, whereby the neutralizing signals to condenser 96 are effective. An RF choke of high impedance may of course be substituted for dropping resistor 113, as used in Figure 1 of the referred to patent application.

Mixer stage 51' is a pentode section of a tube including triode section 51'', and in the instant embodiment is a type 6AT8 dual purpose tube. The mixer input coil 82' is coupled to the triode output coil 81' by mutual coupling inductance M, and is connected through contacting members 48, 50 to control grid 115 of mixer 51' through coupling condenser 116.

Adjustable condenser 117 in the mixer input is effectively connected in parallel across coil 82' through the ground connections thereof. The input circuit of mixer stage 51', comprising the parallel tuned circuit 82'—117, is at the channel frequency corresponding to the selected panel 25a'. Series resistors 118, 119 constitute the return grid path to ground, and are connected at their junction by lead 120 to test terminal T external of the tuner. The lead 120 passes through chassis 106 through a lead-through condenser 121, which in the exemplary embodiment is 30 mmf. The screen grid 122 of mixer stage 51' is suitably biased from the B+ terminal through lead 114 and series choke 123. Plate 124 of the mixer stage has an output coil 125 adjustably tuned by slug 126, to the intermediate frequency, which in the exemplary embodiment is at nominal 41 megacycles. The anode potential is applied to plate 124 through coil 125 by dropping resistor 126.

The oscillator section of tuner 20 comprises triode 51''. Plate 130 of oscillator 51'' has connected in series fine tuning condenser unit 131 and oscillator coil 83' of panel 25a to predetermine the frequency of the oscillator in a well-known manner. The coil 83 is interconnected by contacts 48, 50 between fine tuning condenser 131 and grid electrode 135 through the coupling condenser 134. The anode potential to oscillator tube 51'' is supplied from B+ lead 114 and dropping resistor 136. A grid leak 137 and condenser 138 complete the oscillator circuit. The fine tuning condenser 131 is controlled by the shaft 33a (see Figure 1) which motivates a variable plate 132 with respect to a fixed condenser member 133.

The oscillator frequency is generated at 41 megacycles above the channel carrier frequency to which panel 25a corresponds. The mutual coupling M' between oscillator coil 83 and mixer coil 82' within the panel 25a configuration establishes the injection of the oscillator signal to grid electrode 115 of the mixer stage 51'. Heterodyning by mixer 51' results in the 41 megacycle I.F. signal output containing the channel modulations at terminal O. A grounded shielded cable 140 is used to conduct the I.F. frequency output from terminal O to the remainder of the receiver. Terminal O is by-passed to ground by a small condenser 139.

Utilization of the triode amplifier 24 for high frequency gain depends upon effective neutralization of the voltage fed back from the plate circuit to the control grid 90 thereof. As is known in the art, to effect neutralization it is important to obtain for all frequencies in the band a voltage inserted back to the grid electrode of the triode substantially equal in magnitude and 180° out of phase with the voltage being induced to the grid 90 by the plate electrode 92 via the inter-electrode capacity existing therebetween. The signal inserted back should be identical with the signal induced through the inter-electrode capacity, which of course is the identical signal to that in the plate circuit of the triode, duly amplified with respect to that originally introduced to the input circuit at the grid 90.

By introducing a counter-voltage to the control grid 90 of substantially the same magnitude as that introduced to it by the feed-back of plate 92 through the inter-electrode capacity, of identical wave form but substantially 180° out of phase therewith, the effect of the feed-back is cancelled to effect neutralization of the triode 24. Thus the full amplification potential of the triode is realized over the frequency range that such neutralization is effective. The present invention is directed to make such neutralization effective over the VHF television frequency range, as originally set forth. The exemplary tuner 20 is neutralized in the range of 54 through 216 megacycles for the 12 television channels.

The effective neutralization to be described functions properly, and provides full gain of the triode comparable to that of a cascode or pentode amplifier for any of the 12 channels. The associated panel 25a circuitry is inserted or assembled into the basic tuner 20 circuit for operation on a particular channel. The neutralization provided by the present invention is fixed with the basic or fixed parts of the amplifier circuit, and remains effective over the full range of channels selected for operation in the tuner circuit.

An important neutralization feature, I have discovered, comprises the use of a particular capacitance with negligibly low inherent inductance, such as a feed-through or a button-type capacitor, to couple the output circuit of the triode to its neutralizing condenser (96), and in turn to the control grid (90) electrode. In Figures 13 and 14 a feed-through capacitor is used at 94, connecting point D of lead $d$ to contactor 50' and contact 48' to the base of output winding 81' and panel 25a; and to the neutralizing condenser 96 at point E. Chassis 95 is grounded as a structural member of the tuner 20 chassis. The outer layer 94a of feed-through capacitor 94 is connected to ground either directly or through the panel 95 in which it is mounted.

The bottom or inside and insulated terminal E of feed-through capacity 94 is connected to a suitable adjustable neutralizing capacity 96, terminal lead 91' of triode 24 connecting to one side of grid electrode 90. In order to minimize extraneous inductances between point D and grid connection 91', it is important that triode 24 be in reasonably close proximity with the winding 81', so that the distance between points D, E and terminal 91' are as short as possible. Thus, any inductance due to the leads of neutralizing condenser 96 between points E and 91' will have negligible effect on the effected neutralization, as will be described.

Reference is made to schematic Figure 15 for a better understanding of the principles and practical results of the utilization of the effective novel neutralizing circuit including feed-through capacitor 94 in the described circuit. In Figure 15 a capacity $C_0$ is shown representing the full plate 92 circuit to ground capacity including the plate 92 internal capacity in triode 24 to cathode 97 ground, as well as additional circuit external capacitances in the output circuitry of tube 24 including condenser 93 and capacities $C_3$, $C_4$ and $C_5$. In other words, $C_0$ represents the total effective capacitance of the triode 24 output (and internal) to ground including that of condenser 93, contacts 48', 50' and of coil 81'. Coil 81' is designated as $L_0$. In the exemplary tuner 20 circuit, adjustable trimmer condenser 93 has a range of .5 to 3 mmf. Similarly, the capacity $C_1$ schematically represents the effective capacity to ground of feed-through condenser 94 as connected between points D and E in the circuit of Figures 13 and 14.

The circuit comprising $C_0$, $L_0$ and $C_1$ is a pie network, as shown in Figure 15. The voltage at point F represents the output RF signal of triode 24 that is coupled through coil 81' into mixer 51'. The potential at point E corresponds identically to wave form at point F, with the exception that it is substantially 180° out of phase therewith. The amplitude at point D may be substantially that at point F, or somewhat less if an effective resistance is in the $L_0$ circuit. However, all the inductances of the $L_0$ circuit (including leads) may be considered lumped between points D and F, with the potential at point D substantially 180° out of phase with that at F.

One aspect of the feed-through condenser 94 is to relate the potential at D to the neutralizing condenser 96 at the proper 180° phase displacement. This is accomplished by the fact that the feed-through condenser 94 has practically no inductance as viewed from point E towards point D, being effectively a true capacitance in this relation. Similarly, it is a true capacitance at point D, looking towards point E. If an effective inductance were introduced between points D and E, the 180° phase relation would be upset for the purpose of neutralization of triode 24. The signal would not arrive at the grid electrode 90 sufficiently in phase to neutralize the signals of the band induced thereto from plate 92. The triode 24 could, therefore, not effectively amplify, as required, over the VHF range. The effect of feed-through condenser 94 is further detailed hereinafter.

The feed-through outer sleeve 94a is connected to ground, as indicated in Figure 17. It is desirable that the order of capacitance of the feed-through $C_1$ be particularly related, as will be set forth to effective capacity $C_0$. In examplary embodiments for tuner 20, feed-through condensers 94 were used of the order of 10 to 50 micromicrofarads, as required, dependent upon the effective value of $C_0$ and $L_0$ for a given tuner. It is important to have negligible inductance added at point D for the connection of the neutralizing condenser 96 and to tie down or lump the inductances into $L_0$ for the pie network relationship shown. However, different values of capacity $C_1$ merely result in different amplitudes of the signal at point E which, when related to the required feed-back signal at grid electrode 90, may be taken care of by the size of the neutralizing condenser 96 where within range.

The neutralizing condenser 96 is an adjustable one in order by initial adjustment to properly and fully effectuate full neutralization for a particular triode 24 and tuner 20 over the VHF frequency range. It is to be understood that the capacitive values of neutralizing condenser 96 and feed-through condenser 94 utilized are dependent upon the capacities otherwise in the triode 24 output circuit including $C_0$ and $C_3$, $C_4$, $C_5$, as will be set forth in detail hereinafter.

The inductance of the leads of the neutralizing condenser 96 between points E and terminal G to lead 91' is kept small so as to be not too important herein. It is desirable and important to keep the over-all lengths of the leads from neutralizing condenser 96 to points G and E as short as practicable.

An important feature of the present invention is the effective inductive isolation of the electrical interconnection between output coil $L_0$ (81') and the neutralizing condenser $C_n$ (96). This is effected in the embodiment of Figures 13 to 15 by the feed-through capacitor 94 ($C_1$). The capacitor 94 isolates coil $L_0$ connection to D from condenser 94 connection to E by pure capacitance effects. The significance of such isolation of $L_0$ and $C_n$ across D and E is more fully set forth hereinafter in connection with Figure 20.

Figure 16 is a schematic representation of the electrical equivalent action of feed-through condenser 94 in the high frequency circuitry herein. The short internal conductor 94c, within condenser 94, is represented as with negligible linear inductance action. Conductor 94c is capacitatively related to the grounded shield (not shown) by a multiplicity of unitary capacitances $C'$, $C'$ to ground. The summation of all the $C'$, $C'$ capacitances equals the effective capacity $C_1$ of condenser 94, which in effect obliterates any inductive effects by conductor 94c.

The short lead-in inductance from point D to internal conductor 94c is labeled $L_a$; that from point E, $L_b$. The inductance of the lead from coil $L_0$ to point D is $L_1$; that of the lead from condenser $C_n$ to point E, $L_2$. The effective inductance sum of $L_1$ and $L_a$ remain part of the $L_0$ tank circuit for its frequency determination. Hence, the tuned coil 81' circuit $L_0$ looking into feed-through condenser 94 sees only effective capacity $C_a$. The effective inductance sum $L_2$ and $L_b$ is small and does not disturb effective neutralization to the grid 90, through neutralization condenser $C_n$, which circuit portion looking into condenser 94 sees effectively pure capacity $C_b$. Inductive reaction or mutual coupling between the tank current at $L_1$ and the grid circuit at $L_2$ are thereby eliminated.

Figure 17 shows a cross-section through a feed-through capacitor embodiment for unit 94. The feed-through conductor 94c subtends points D and E on either side of the unit 94. A dielectric sleeve 94b, such as of ceramic material, surrounds conductor 94c. A conducting layer 94a, such as silver, is mounted or electroplated about the dielectric 94b. The feed-through condenser 94 is mounted through an opening in the chassis or panel 95 which is metallic to effectuate a ground for the external layer 94a of the feed-through condenser 94. Other known constructions for the feed-through condenser are, of course, equivalently usable herein.

Figure 18 shows an alternate to the feed-through condenser 94, comprising button capacitor 145. A button capacitor is also one with very low or negligible inductance with respect to the frequency ranges utilized in the exemplary embodiment. The bottom surface 146 of button capacitor 145 is secured or otherwise soldered to plate 95 which is a chassis portion. The button capacitor 145 is connected in the circuit in place of the feed-through condenser 94 wherein its terminal D" is connected directly to the corresponding bottom side of the output coil 81' of Figure 14; and its terminal E" is connected directly to one side of the neutralizing condenser 96. It has been found that equivalent results are achieved by neutralizing a triode such as the exemplary unit 24 with a button capacitor 145 as with a feed-through condenser 94 in the described embodiment.

Figure 19 is a schematic representation of the neutralized circuit corresponding to Figure 15. Output coil 81' is represented by $L_o$ between points F and D. Plate 92 is shown connected to point F. The plate to cathode capacitance $C_{pk}$ is included in $C_o$ connected from point F to ground. The effective capacitance $C_1$ includes the capacity of the feed-through condenser 94 and is shown connected between points D, E and ground. Likewise, the neutralizing condenser $C_n$ is connected between points E, D and the input terminal point G to grid electrode 90.

The grid to plate interelectrode capacitance $C_{gp}$ is indicated between points G and F, namely between the grid 90 and plate 92 electrodes. The four condensers illustrated in Figure 19 are arranged as four arms of a capacitance network. I have found that by substantially balancing up the network capacity arms, the neutralization described herein is effective for signal amplification reasonably uniformly throughout the range from 50 mc. (and below) through 250 megacycles (and above) without need for neutralization circuit changes.

It is to be understood that in any particular tuner 20 embodiment incorporating a turret switching structure and a specific triode amplifier stage 24, for example, a type 6BN4 tube, the inherent and fixed capacities of the capacitative network configuration of Figure 19 may be calculated or measured. Accordingly, the two circuit elements which are added for neutralization, namely feed-through condenser 94 and neutralizing condenser 96, are selected in accordance with the principle now to be enumerated.

As hereinabove set forth, the four capacitive arms of the bridge network (see Figure 19) are constituted as follows: The capacitive arm $C_o$ is the effective capacitive summation of $C_{pk}$ of tube 24; the value setting of trimmer condenser 93 (which in the exemplary embodiment is adjustable from 3 to .5 mmf.); and the inherent capacitive entity existing between plate electrode 92 and point F' at the top end the selected inductance 81' including the capacity to ground of the intervening switch contactor 50' and contact button 48' (as represented by the corresponding capacities $C_3$, $C_4$ of Figure 13); distributed capacity $C_5$, $C_5$ of coil 81; and the terminal capacities at 48', 50' and to point D. In a given turret tuner 20, the value of the capacitive arm $C_o$ remains reasonably constant for each of the plurality of channel positions, corresponding to the various panels 25 as set forth in full hereinabove. The important factor is that channel selection, and accordingly tuning over the broadcast frequencies, is accomplished in the tuner construction of the present invention, namely the turret or rotatable wafer types hereof, by maintenance of the triode output capacitive switching reasonably close to a given value that is integrated in the neutralization circuit. In the exemplary embodiment, $C_o$ is 9 mmf.

The capacitive arm $C_1$ is the effective capacity to ground of feed-through condenser 94 connected between points D and E. For the turret tuner 20 embodiment herein, incorporating a 6BN4 triode 24, the feed-through condenser 94 used has a capacity value of 48 mmf. The third arm of the bridge network of Figure 19, namely $C_{gp}$, is essentially the grid to plate capacitance between electrodes 90, 92 of tube 24, which in the 6BN4 is 1.5 mmf.

Finally, the fourth capacitive arm of the bridge, namely $C_n$, is a neutralizing condenser which is adjustable over a sufficient range to effect balancing of the circuit of the four-arm bridge and effect neutralization over the wide VHF band of frequencies. In the exemplary embodiment, the adjustable neutralizing condenser 96 conducting signals from point E to the grid input point G of tube 94 has a capacitive range of 1.5 to 10 mmf. This range of adjustment has been found satisfactory in production and field checked tuners to effect specific neutralization for the described tuner 20 embodiment that remains effective over all of the twelve VHF television channels, with high amplification and gain by the triode stage. In the exemplary tuner 20, with the capacitive values herein stated, the neutralizing condenser was set at 8 mmf.

As a close guide and target for the selection of the parameters and circuit design of the four capacitive arms of tuner 20, corresponding to the neutralized triode 24 amplifier as illustrated in Figures 13 to 15, the following formula for the bridge network balance (see Figure 19) is expressed: $C_1:C_o=C_n:C_{gp}$. I have found that by designing or otherwise selecting the parameters of the tuner to establish the balanced capacitive four-arm network relationship as per this formula, stable neutralization is effective in the triode stage 24 of the turret tuner 20 over the whole VHF band. Also, its gain is comparable to the gain and frequency characteristic of a pentode and a cascode stage. The neutralized triode amplifier herein has the further advantages of excellent low noise characteristic, circuit simplicity, and lower cost.

The formula of network balance for the four capacitive arms may be viewed as a target for design of first order values. In other words, the selection of feed-through condenser 94 and the range of neutralizing condenser 96 are related to the inherent and fixed capacities which otherwise determine the four arms of the capacitor network herein. While it is desired to balance the network in accordance with the formula ratios set forth above to obtain highest gain and amplification, perfect neutralization over this range is not essential in practice. Modest deviations from true balance, i.e., the values indicated by the formula, have been found to result in practical tuner triode stages with small departures from optimum. Thus, the exemplary values for $C_1:C_n=C_o:C_{gp}$ are 48:8=9:1.5.

Significant aspects of the present invention reside in the recognition of the substantially balanced network effected through the four capacitive arms comprising the configuration and circuit network of Figure 19, and including the specific pie-filter configuration of Figure 15. This is accomplished by proper setting of the neutralizing condenser $C_n$ and the construction of such network configuration by the incorporation of the low inductance feed-through type capacitor of proper capacity in the network circuit. Furthermore, and important to the network herein, is the establishment of switching contact arrangements for the plurality of output coils corresponding to 81' for the plurality of channels to produce negligible variation in the capacitive aspects contributed by the switching contacts and the coils over the channels.

I have found that by substantially deviating from the parameters for the four capacitive bridge arms of Figure 19, corresponding to the circuit configurations of Figures 13 to 15, the gain versus frequency relationship over the VHF band was not uniform and dropped at the higher frequency end. Further, I have found that where a tuner channel switching arrangement is used such that it materially changes the capacitive values corresponding to $C_3$, $C_4$, $C_5$ (Figure 13) for the plurality of channels, one or more of the frequencies in the VHF band are not effectively neutralized and regeneration or very low gain prevails. Furthermore, by departing from the circuit configurations described, or their parameter relationships, within reasonable limits, renders triode neutralization impractical or ineffective for commercial tuners for television VHF reception.

In practice, for a given embodiment the neutralizing condenser $C_n$ is adjusted through test and instrumentation procedure understood by those skilled in the art, to effectuate the best setting for the neutralizing condenser for the practical and stable amplification of all the twelve channel. Once adjusted, the netralizing condenser (96) is left alone for operation and use of the tuner (20) in a television receiver. The other capacitive arms of the network remain constant in a given tuner 20, except for the minor capacitive variations due to the switching contactors corresponding to 48, 50 as aforesaid in the turrent tuner.

Figure 20 is a schematic representation of a typical prior art neutralizing circuit for a triode amplifier 200. The input circuit for triode 200 comprises step-up transformer 201 having a primary winding 202 and secondary winding 203. Secondary winding 203 has a condenser 204 connected in parallel therewith. Parallel tuned circuit 203, 204 is connected to the grid electrode 205 of triode 200. The cathode 206 of the tube is grounded. The output circuit of the triode 200 comprises output inductance coil 207 connected to points 208, 209. Condenser 210 is connected electrically in parallel with output coil 207, and the ground.

The B+ supply is connected by lead 211 to terminal point 212, and onto output coil 207 through lead 214. Coil 207, tuned with parallel condenser 210, is connected to plate 214 of tube 200. The neutralizing condenser $C_n$ is adjustable and connected from B+ terminal point 212 connected to the "bottom" side of output coil 207, and to the grid electrode 205, through leads 214, 216, 217. A condenser 220 (of sizable capacitance), is shown as connected between terminal point 212 and ground, used as a filtering condenser for the B+ supply to the output coil 207. Condenser 220 is usually of substantial capacity for filtering action, and in Figure 20 represents the effective capacity to ground at signal frequencies of the B+ supply at terminal 212.

In pointing out the features and advantages of the invention system, the deficiencies of the prior art in the high frequencies, namely in the 50 to 250 megacycles range, are now described. At such high frequencies the actual lead lengths between components comprise inductances that provide siginficant reactances in the circuit. Such reactances cause deleterious results, and in fact in the prior art circuitry cannot be used with circuit components fixed throughout the 50 to 250 megacycle band.

Towards this end the lead inductances at terminal 212 have been indicated as follows: lead 214 to output coil 207, with an effective inductance $L_1$; lead to neutralizing condenser $C_n$, with inductance $L_2$; and the lead to grounded condenser 220, with inductance $L_3$. It is these very inductances $L_1$, $L_2$, $L_3$ that create reactances in the frequency range herein that disturb any neutralizing action that is correct at one section from being correct over the band. It requires readjustment in, for example, neutralizing condenser $C_n$ at different frequency sections along the stated wide frequency band.

Thus, it is noted that when lead 214 to coil 207, and lead 217 to condenser $C_n$ are connected to the same terminal (212), their juxtaposition creates a mutual inductance or coupling between their effective inductances $L_1$ and $L_2$. It is understood that when the amplifier stage including triode 200 is in operation, that the plate circuit 207—210 causes a significant plate current at the signal frequencies to flow through coil 207, and, therefore, thru lead 214 to terminal 212. Also, it is understood that for efficient operation of amplifier 200, negligible grid current flows in grid electrode 205, and hence through leads 216, 217 containing neutralizing condenser $C_n$.

The relatively large current flowing through inductance $L_1$ thereby induces a counter-voltage at the signal frequencies into inductance $L_2$ and neutralizing lead 217, even though the mutual coupling inductance therebetween be small. Such induced voltage deteriorates the normal neutralizing signal encompassed by neutralization connection $C_n$, and shifts the phase of the signal impressed on the grid 205. Furthermore, the presence of inductance $L_3$ in the condenser 220 leg also creates misphasing of the signal voltage at the high frequencies.

The significance of the inductances $L_1$, $L_2$ and $L_3$ and the mutual couplings therebetween, may be also viewed as follows. At the higher frequencies, the inductive coupling between $L_1$ and $L_2$ is more effective in inducing deleterious signals than at the lower frequency end of the wide band. Thus, if the neutralizing condenser $C_n$ were adjusted to provide proper neutralizing magnitude at grid 205 for channel 13 (216 megacycles), then at channel 2 (54 megacycles) the inductive reaction from $L_1$ to $L_2$ would induce a voltage correspondingly less in magnitude than at the higher frequencies.

Thus, in prior art circuit Figure 20 the capacity setting of $C_n$ for channel 13 would produce over neutralization in the triode 200 at channel 2, reducing its gain substantially. In order to balance out the overall gain of the tube 200 for channels 2 to 13 (e.g. or from 50 to 250 megacycles) the condenser $C_n$ would have to have specific values different at channel 2, and perhaps for intermediate channels, as at channel 13. This was a major practical defect of the prior art neutralization circuitry. Several neutralizing condensers were thus needed for amplifying a wide band of high frequencies, rendering their incorporation costly or impractical.

Figure 21:
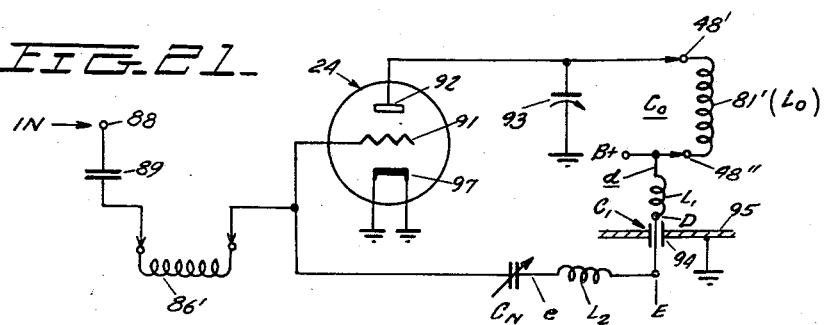
Figures 21, 22 are further schematic circuits of the invention neutralizing system.

In accordance with the present invention such defects outlined in connection with Figure 20 of the prior art are effectively overcome, providing substantially uniform neutralization throughout the wide high frequency range (e.g. 50 to 250 megacycles), and including channels 2 to 13 of the television VHF band. Towards this end Figure 21 is circuitally illustrative of the exemplary tuner circuit, corresponding to Figures 13, 14 and 15. Triode amplifier 24 has impressed upon its grid 91 the input signal through the series resonant circuit comprising coil 86' insertable in the circuit, with fixed condenser 89 at input terminal 88. The output circuit of triode 24 comprises a selected coil 81' (corresponding to the frequency) connectable through its terminals 48', 48" to the fixed tuner circuitry, and adjustable condenser 93 in parallel.

The neutralizing condenser $C_n$ is connected between grid electrode 91 and the "bottom" terminal of output coil 81' through the shield 95 by means of feed-through condenser 94 set in chassis 95, as hereinabove described in connection with Figures 13 to 15. The plate 92 total output (and internal) capacitance is indicated as $C_o$ in Figures 21 and 22. The total effective capacitance to ground of feed-through condenser 94 is indicated as $C_1$. Lead $d$ between the bottom end 48" of coil 81' connects to terminal D of feed-through condenser 94, and has the effective inductance $L_1$ as indicated. Lead $e$ connecting neutralizing condenser $C_n$ to terminal E of feed-through condenser 94 is indicated as $L_2$.

Figure 22:
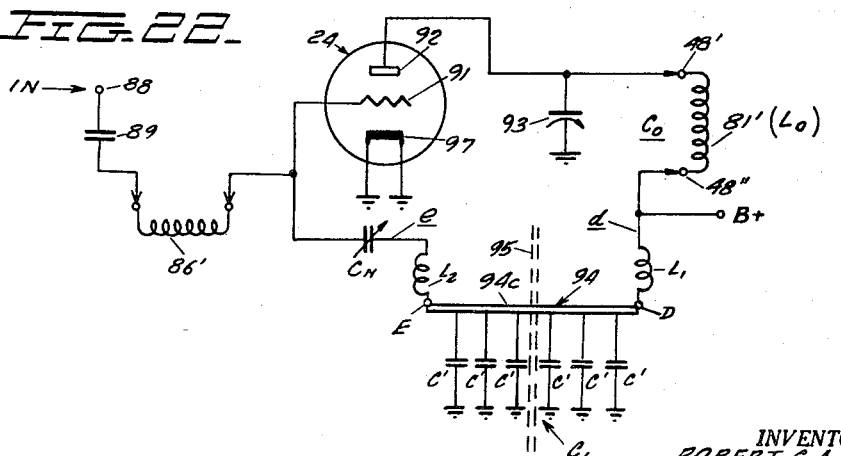

A significantly different action occurs in the electrical neutralizing operation of the invention circuits of Figures 21 and 22, as compared to the prior art. It is to be noted that an electrical shield 95 exists between the effective lead inductances $L_1$ and $L_2$, destroying mutual inductance therebetween as otherwise existed in the prior art system of Figure 20. Further, leads $d$ and $e$ are inter-connected through feed-through condenser 94, and each coupled to ground through the effectively pure capacitance viewed by these leads at their respective points D and E of condenser 94.

For most effective results, the value of through-condenser 94 is preferably related by the above stated formula to capacitances $C_o$, $C_n$ and $C_{gp}$, in the high frequency range of amplification herein. The formula $C_1:C_o=C_n:C_{gp}$ results in condenser $C_1$ (94) selection commensurate with $C_n$ proximate adjustment, and $C_o$ and $C_{gp}$ designed into the circuit. The condenser $C_1$ selection and $C_n$ adjustment when so related afford maximum amplification over the widest frequency range without in the $C_1$ or $C_n$ values. A practical triode amplifier 24 results for the tuner herein, with $C_o$ value kept reasonably constant over the coil (81') switching actions for the VHF channel selections, as hereinabove explained.

While the feed-through condenser 94 ($C_1$) affords excellent results, with the chassis 95 serving as a shield between $L_1$ and $L_2$, the button-type capacitor 145 referred to (Figure 18) also gives good stable neutralization. Other feed-through forms equivalent and useful to the feed-through condenser 94 may be used without departing from the broad spirit and scope of the invention. Essentially a shield is introduced by means of, for example, chassis 95, or otherwise between effective inductances $L_1$ and $L_2$ of leads $d$ and $e$ to minimize or negate any mutual inductance or coupling between the plate 92 output circuit 81'—93 including lead $d$ and the neutralizing circuit $C_n$ including lead $e$. Also the leads $d$ and $e$ do not have an unshielded common juncture or terminal. Finally and preferably the leads $d$ and $e$ are each coupled to ground by capacitance (with negligible inductance); with the capacity ratio formulation giving best results.

Good results also are obtained by using the transverse shield (95) with interconnection through an aperture thereof, but with small capacity to ground. A through-terminal in a dielectric plate set in an aperture of the shield (95), would also afford negation of the $L_1$ to $L_2$ coupling and stabilize the neutralization by $C_n$ as the shield thus isolates leads $d$ and $e$. In the through-shield interconnection of leads $d$ and $e$ as herein outlined, auxiliary condensers may be employed to couple leads $d$ and $e$ to ground in the manner of the single feed-through condenser 94. I have found of these alternatives to the invention that the feed-through condenser 94 is the more simple and effective manner.

The interconnection of leads $d$ and $e$ for picking off "the 180° out of phase signal" from the bottom end 48" of inductance 81' to pass on to the grid 91 is effectuated without mutual coupling between $L_1$ and $L_2$. The invention system provides the proper feed-back signal to tube 24 for neutralizing purposes. The feed-through condenser 94 interconnects lead $e$ of condenser $C_n$ to the lead $d$ of coil 81' across the shield or chassis plate 95. This feature constitutes an essential advantage over the prior art and renders a triode eminently practical as an amplifier of high gain and low noise. As determined from extensive field testing with television tuners operated on the VHF frequency range and also tests above such frequencies, a single triode in the RF stage performed with the circuits hereof as well as a cascode double triode circuit with fixed circuitry. Also as described above, the series connection of resonant circuit 86', 89 at the input of the triode 24 to grid 91 minimizes phase distortion and extraneous inductance at the neutralizing connection of condenser $C_n$ to grid 91.

Figure 22 is the same as the exemplary neutralized triode circuit of Figure 21 with the exception that feed-through condenser 94 is shown in its expanded schematic electrical version, corresponding to that of Figure 16. The remaining elements of Figure 22 are identical to that of Figure 21 and bear the same numerals. The feed-through condenser 94 is in effect a plurality of smaller condensers in parallel, connecting central conductor 94c to ground through the elemental $c'$, $c'$ units. The inductance $L_1$ at terminal D of condenser 94 sees it as purely capacitive, as viewed into the feed-through condenser 94 from the B+ terminal and terminal 48".

There is no direct connection of an inductive nature between $L_1$ and the opposite inductance $L_2$.

The feed-through condenser 94 aided by shield 95 inhibits mutual coupling or any inductive reaction between the signals in coil $L_1$ to the inductance $L_2$. Thus an important defect of the prior art arrangements, where $L_1$ and $L_2$ are joined to a common unshielded terminal 212 is avoided (see Figure 20). The signal currents from coil 81' flowing into inductance $L_1$ are bi-passed to ground through the effective condenser action by $c'$, $c'$ of unit 94. Thus no signal currents are effective on lead inductance $L_2$ through the action of the feed-through condenser 94, which effectively decouples the signal currents from $L_1$ to $L_2$. Thus no deleterious signal induction is produced in inductance $L_2$ to interfere with the basic neutralizing voltage of condenser $C_n$.

The proper voltage signal level to condenser $C_n$ is transmitted along conductor 94c of condenser 94 on to grid 91. In other words, the feed-through condenser conductor 94c connecting the terminals D and E effectively transmits a voltage signal at the 180° phase displacement required, and of a suitable magnitude, to effect the requisite neutralization input to grid 91 to offset the signal feedback from plate 92 to grid 91. By establishing the aforesaid formula or ratio as a target for the condensers, namely $C_1:C_o=C_n:C_{gp}$ we provide optimum neutralization and amplification for the wide high frequency signal band in the exemplary system.

Feed-through condenser 94 effects conduction of the necessary signal potential to the neutralizing condenser $C_n$ at lead $e$ while with shield 95 effectively isolates and shields any inductive action between the leads $d$ and $e$, as will now be understood by those skilled in the art. With the circuits of Figures 21 and 22 (and Figures 13 to 15), once the condenser $C_n$ is properly set at say channel 13, effective neutralization maintains for all the other channels down to channel 2 without resetting.

No other circuit switching is needed for maintenance of neutralization over the wide frequency band of operation. It is understood that the circuit of Figures 21 and 22 also encompasses a substantially constant $C_o$ output capacitance for triode 24 as provided by a turret or rotatable wafer type of tuner construction, as aforesaid. The maintenance of the output capacitance of $C_o$ for the variouns channels or frequencies utilized is a significant contribution to the stabilization and neutralization for the wide frequency range neutralized by the invention.

The overall tuner 20 circuit provides a triode amplifier stage 24 for the VHF band neutralized to give its maximum effective gain, resulting in a gain comparable to that of pentode and cascode circuits. The cost of a triode tube is less than that of a cascode or pentode tube, and results in a substantial saving, particularly when it is considered that fewer circuit elements are needed therefor.

The triode 24 may be one-half of a dual tube, with further savings when the second section is used for another part of the circuit, as for the oscillator or mixer stage. Should neutralization of a second triod in the amplifier of the high frequencies be required, the principles utilized and described in connection with that for triode 24 may, of course, be provided independently. It has been found that the sensitivity and noise figures over the VHF range for the circuit of Figures 13 to 15 with an RF triode 24 are excellent, and compare directly with that of a good cascode amplifier output.

In exemplary tuners constructed in accordance with the circuit of Figure 14 the following are typical performance characteristics established by field tests:

a. Channels 2 through 6; more than 32 db gain and less than 7 db noise; which is excellent.

b. Channels 7 through 13; more than 28 db gain and less than 8 db noise; also excellent.

c. Individual UHF strips converting UHF channels through the VHF tuner; sensitivity and noise figures equal to or better than previous more complex and costly tuner systems.

d. Operation less susceptible to overload than cascode or pentode tuners because of positive AGC action on the triode amplifier.

e. Improved tilt characteristic of the VHF channel band reception curves with AGC bias changes.

f. Improved VSWR ratios over prior art tuner circuits.

g. Less affected by ignition noise and numerous other sources of electrical interference due to the use of the two filter circuits 102, and 104—105 arranged in stagger tuned relation.

Figure 23 is a schematic showing of a modified version of the neutralized triode amplifier per Figures 13, 14 and 21. The circuit is the same except for the condenser-isolator 230 used in place of the feed-through type 94; the same numerals indicating like components and arrangement. Condenser 230 is shown as formed of two parallel capacitive bodies 231, 232. Capacitive bodies 231, 232 may be plates, or foil spaced by dielectric or air, or may be in linear or tubular form. Essentially condenser bodies 231, 232 for the condenser-isolator 230 have three terminals; one body (231) with two terminals D; E; and the other body (232) with one, F'. There exists a distributed capacitance between terminals D' and E' along body 231 with respect to body 232. The action of condenser-isolator 230 in neutralizing triode 24 of Figure 23 is the same as that of feed-through condenser 94 as described in Figures 21 and 22; with an effective $C_1$ capacity value.

Figures 24, 25 and 26 illustrate further forms which condenser-isolator 230 of Figure 23 may assume in practice. Figure 24 is a three terminal condenser 235, with central body 236 having two spaced terminals D', E'; and an outer body 237 with one terminal F' usually grounded. Condenser body 237 is dish shaped having end portions 238, 239 which overlap to enclose the ends of ceneral body 236. Conductive bodies 236, 237 may be flat plates of circular or rectangular shape, constituting a "disc" capacitor. Condenser-isolator 240, Figures 25, 26, has a central body 241 enclosed substantially by outer conductive body 242. Body 242 may be wrapped about central body 241 with dielectric spacing. Central body 241 is characterized by having distributed capacity with respect to outer body 242, and negligible inductance between its spaced terminals D', E'. Figure 26 is an end view of the condenser of Fig. 25.

The above described versions of my novel neutralized triode system embody a plate-tuned circuit with the neutralizing condenser $C_n$ connected from such circuit to the grid electrode. The features and advantages of the condenser-isolator or feed-through condenser stabilization of the neutralization over the whole VHF band may be varied, as will now be understood by those skilled in the art. A "reverse" version thereof is illustrated by the circuit of Figure 27 using a tuned grid input arrangement. The triode 250 has an output coil 251 connected to anode 252. A secondary winding 253 is tuned by condenser 254. The input primary winding 255 is coupled to secondary coil 256 across which condensers 257, 258 in series, establish the tuning for the grid input 260. The terminal 261 between condensers 257, 258 is grounded, as is the cathode 262. The condenser-isolator 265 connects the neutralizing condenser $C_n$ from the anode 252 to the "bottom" end 266 of the grid tuned circuit 256, 257, 258 through the central body portion 267 with spaced terminals D', E'. The outer or shield body 268 is grounded as in the other embodiments. The stabilization of the neutralization in Figure 27 is similar to that hereinabove described.

Although the invention has been described and illustrated for neutralizing triodes, it will be apparent that the same principles may be utilized for neutralizing other tube circuits, such as a pentode. Also, although the invention has been illustrated in connection with its application to a television tuner amplifier, it will be apparent that it may be used in any wide band amplifier in the high frequency ranges. Furthermore, although exemplary embodiments of the invention have been described and illustrated, modifications may be made by those skilled in the art without departing from the broader spirit and scope of the invention and as defined in the appended claims.

I claim:

1. A V.H.F. television tuner for broadcast channels over the 54 to 216 megacycle range comprising a triode amplifier having a grid, a plate and a cathode electrode, an assembly containing a plurality of output inductances predetermined for the frequencies of operation of the tuner, means for selectively connecting one of said output inductances into the triode amplifier circuit, one end of the selected output inductance being connected to said plate, condenser means with negligible inductance having a conductive member and a metallic section capacitatively related to said conductive member, said metallic section being connected to signal ground, said conductive member having two spaced connection portions, a neutralizing capacitor, a first lead connecting one of said connection portions to the selected output inductance, a second lead connecting the other of said connection portions to said neutralizing capacitor and establishing a conductive connection between said selected output inductance and said capacitor through said conductive member, said metallic section coacting with said conductive member and being proportioned to effectively inhibit inductive coupling between said first and second leads, said neutralizing capacitor connecting to said grid electrode and having a predetermined capacitance value to provide counter signals to said grid electrode, stabilizing the tuner amplifier over the frequencies throughout the V.H.F. range.

2. A television tuner as defined by claim 1 in which the ratio of the capacitance of the neutralizing condenser to the grid-to-plate capacitance of the triode, is substantially the same as the capacitance of the condenser means to the capacitance of the plate electrode and its associated output circuitry to signal ground.

3. A V.H.F. television tuner comprising a triode amplifier having a grid, a plate and a cathode electrode, a rotatable turret containing a plurality of output coils and a plurality of input coils associated with individual of said output coils for predetermining the frequencies of operation of the tuner, means for selectively connecting said output and input coils as associated pairs in the triode amplifier circuit including contacts for each of said coils and a set of contactors engageable therewith, said contactors being fixed to the tuner body and in circuit with the triode amplifier for connecting a selected pair of coils with the amplifier circuit with substatially uniform capacitance effects for the different coil pairs, one end of the selected output coil being connected to said plate electrode through a first engaged contact and contactor, condenser means with negligible inductance having a conductive member and a metallic body portion capacitatively related to said conductive member and connected to signal ground, said conductive member having two spaced terminals connected thereto, a neutralizing capacitor, a first lead connecting one of said terminals to the selected output coil through a second engaged contact and contactor, a second lead connecting the other of said terminals to said neutralizing capacitor and establishing a conductive connection between said selected output coil and said capacitor through said conductive member, said body portion coacting with said conductive member and being proportioned to effectively inhibit inductive coupling between said first and second leads, said neutralizing capacitor connecting to said grid electrode and being adjusted to a value to provide a counter signal to said grid for stabilizing the tuner amplifier over frequencies throughout the V.H.F. range.

4. A television tuner as defined by claim 3 in which the selected input coil is included in the tuner input circuit and connected to the triode grid electrode with the input coil in series tuned connection thereto at the corresponding frequency, to afford a relatively high series inductive impedance.

5. A television tuner as defined by claim 3 in which the ratio of the adjusted capacitance of the neutralizing condenser to: the grid to plate capacitance of the triode, is substantially the same as the capacitance of the condenser means and the second contact and contactor to signal ground to: the capacitance of the plate electrode and its associated output circuitry including the first contact and contactor, to signal ground.

6. A television tuner as defined in claim 1 in which the condenser means is a feed-through capacitor having its metallic section mechanically supported in an aperture of a metal plate that is at signal ground, and said first and second connection portions are on opposite sides of said metal plate for inductively isolating the neutralizing condenser and the selected output inductance.

7. An amplifier for a wide band of high frequency signals that are above the order of 50 megacycles comprising a triode stage with plate, cathode and grid electrodes, an output coil with one end connected to said plate electrode, a condenser having a conductive member and a metallic section capacitively related to said conductive member, said metallic section being connected to signal ground, two spaced connection portions on said conductive member, a capacitor, a first lead connecting one of said connection portions to a point on said output coil, whereby the coil subtended together with said condenser and the capacitance to signal ground appearing at the coil plate end provides a countervoltage for stabilizing the triode stage operation, a second lead connecting the other of said connection portions to said capacitor and establishing a conductive connection between said output coil and said capacitor through said conductive member, said metallic section coacting with said conductive member and being proportioned to effectively inhibit inductive coupling between said first and second leads, said capacitor connecting to said grid electrode, whereby said countervoltage is applied to said grid electrode stabilizing the amplifier throughout the whole of said wide band.

8. An amplifier for a wide band of high frequency signals that are above the order of 50 megacycles comprising a triode stage with plate, cathode and grid electrodes, an output coil with one end connected to said plate electrode, a condenser having a conductive member and a metallic body portion capacitively related to said conductive member, said body portion being connected to signal ground, two spaced terminals connected to said conductive member, a neutralizing capacitor, a first lead connecting one of the condenser terminals to a point on said output coil, whereby the coil subtended together with said condenser and the capacitance to signal ground appearing at the coil plate end provides a countervoltage at the other of the condenser terminals for stabilizing the triode stage operation, a second lead connecting the countervoltage at said other condenser terminal to said neutralizing capacitor and establishing a conductive connection between said output coil and said neutralizing capacitor through said conductive member, said body portion coacting with said conductive member and being proportioned therewith to effectively inhibit inductive coupling between said first and second leads, said neutralizing capacitor connecting to said grid electrode, whereby said countervoltage is applied to said grid electrode stabilizing the amplifier throughout the whole of said wide band.

9. A wide band high frequency amplifier as claimed in claim 7, in which the condenser is of the feed-through type.

10. A wide band high frequency amplifier as claimed in claim 8, in which the metallic body portion is external of the condenser and the two said terminals project from opposite ends thereof.

11. A wide band high frequency amplifier as claimed in claim 10, in which the amplifier has a metal chassis portion, and the external metallic body portion of the condenser is conductively secured to said chassis portion with the two said terminals located on opposite sides of the chassis portion.

12. A wide band high frequency amplifier as claimed in claim 7, in which the condenser is of the button type.

13. A wide band high frequency amplifier as claimed in claim 7, in which said one condenser terminal is connected to the end of said output coil remote from its plate end through said first lead, with the said countervoltage established at said other condenser terminal being maintained substantially 180° out-of-phase with signals at said plate electrode throughout the wide band.

14. A wide band high frequency amplifier as claimed in claim 8, in which said one condenser terminal is connected to the end of said output coil remote from its plate end through said first lead, an impedance interconnecting the said remote coil end and a source of anode potential, whereby the said countervoltage established at said other condenser terminal is maintained substantially 180° out-of-phase with the high frequency signals at said plate electrode throughout the wide band.

15. A wide band high frequency amplifier as claimed in claim 8, in which the condenser and the neutralizing capacitor are respectively proportioned at predetermined fixed values that stabilizes the triode stage amplifier over the band of frequencies from 54 to 216 megacycles.

16. A wide band high frequency amplifier as claimed in claim 7, in which the value of the capacitance between the conductive member and the metallic body portion of said condenser is proportioned in conjunction with the inductance of the coil subtended and the said capacitance to signal ground appearing at the coil plate end to compose a pie-network for establishing said countervoltage.

17. A wide band high frequency amplifier as claimed in claim 7, in which the output coil is one of a series of output coils selectively connectable to the plate electrode and said first lead to establish stabilized operation of the amplifier at respective frequency positions through the wide band.

18. A V.H.F. television tuner for broadcast channels over the 54 to 216 megacycle range comprising a triode amplifier having a grid, a plate and a cathode electrode, an assembly containing a plurality of input inductances predetermined for the frequencies of operation of the tuner, means for selectively connecting one of said input inductances into the triode amplifier circuit, one end of the selected input inductance being connected to said grid, condenser means with negligible inductance having a conductive member and a metallic section capacitatively related to said conductive member, said metallic section being connected to signal ground, said conductive member having two spaced connection portions, a neutralizing capacitor, a first lead connecting one of said connection portions to the selected input inductance, a second lead connecting the other of said connection portions to said neutralizing capacitor and establishing a conductive connection between said selected input inductance and said capacitor through said conductive member, said metallic section coacting with said conductive member and being proportioned to effectively inhibit inductive coupling between said first and second leads, said neutralizing capacitor connecting to said plate electrode and having a predetermined capacitance value to provide counter signals to said grid electrode, stabilizing the tuner amplifier over the frequencies throughout the V.H.F. range.

19. A V.H.F. television tuner as claimed in claim 18, in which said condenser means is of the feed-through type with said metallic section being external thereof, and two terminals in individual connection with said portions at opposite ends of the condenser means.

References Cited in the file of this patent

UNITED STATES PATENTS

| | | |
|---|---|---|
| 2,217,408 | Heinecke | Oct. 8, 1940 |
| 2,226,694 | Buschbeck | Dec. 31, 1940 |
| 2,235,198 | Buschbeck | Mar. 18, 1941 |
| 2,247,218 | Braaten | June 24, 1941 |
| 2,511,673 | Lawrence | June 13, 1950 |
| 2,706,798 | Kodama | Apr. 19, 1955 |
| 2,751,444 | Koch | June 19, 1956 |
| 2,798,954 | Gossard | July 9, 1957 |
| 2,818,472 | Eland | Dec. 31, 1957 |

FOREIGN PATENTS

| | | |
|---|---|---|
| 347,402 | Great Britain | Apr. 30, 1931 |

OTHER REFERENCES

Electrical Equipment, December 1943, vol. 3, #12, page 12 (Capacitors—Bushing Mounted Type).